United States Patent [19]

Calvet

[11] 4,098,390
[45] Jul. 4, 1978

[54] BALE UNLOADER

[75] Inventor: Georges Calvet, Villefranche-de-Rouergue, France

[73] Assignee: Ets Calvet, Villefranche-de-Rouergue, France

[21] Appl. No.: 684,912

[22] Filed: May 10, 1976

[30] Foreign Application Priority Data

| May 12, 1975 | [FR] | France | 7514741 |
| May 28, 1975 | [FR] | France | 7516645 |
| Mar. 5, 1976 | [FR] | France | 7606350 |

[51] Int. Cl.² .................................. B65G 47/14
[52] U.S. Cl. .............................. 198/396; 198/454; 198/524; 198/536; 198/857
[58] Field of Search ............ 214/508; 198/390, 396, 198/453, 454, 455, 524, 536, 857

[56] References Cited

U.S. PATENT DOCUMENTS

| 2,753,058 | 7/1956 | Potthoff et al. | 198/524 X |
| 3,292,766 | 12/1966 | Leibelt | 198/396 |

FOREIGN PATENT DOCUMENTS

679,857  2/1964  Canada .............................. 198/453

Primary Examiner—Robert G. Sheridan
Attorney, Agent, or Firm—Gordon W. Hueschen

[57] ABSTRACT

A skip for channelling a load of straw bales to be received by a conveyor is provided. The skip is large enough to receive a load of bales tipped into it from a trailer or other bale transporter. The skip has a conveyor in its floor and in use is set up with one end higher than the other. At the higher end an exit for single bales travelling lengthwise up the floor of the skip on the skip's conveyor is provided through which the bales are conveyed one at a time. The sides of the exit are shaped to turn back incorrectly arranged bales which have travelled up the skip, and these sides may be constituted by frusto-conical rollers. A transverse liftable barrier may also be provided across the width of the skip to knock back bales resting on top of other bales.

3 Claims, 10 Drawing Figures

BALE UNLOADER

The present invention relates to the handling of objects of elongated form stored in bulk, such as bales of straw or hay.

At the present time, the harvesting of cereal crops or hay involves the formation of substantially parallelepipedal bales which a bale loader or thrower attachment assembles in bulk in a trailer fitted with rails. On returning to the farm, these bales are stored in a barn or a loft to which they are conveyed one by one by a suitable elevator. The unloading of the bales on to the elevator is heavy and tedious work.

The essential object of the present invention is to provide an apparatus into which the bales contained in a trailer can be tipped in bulk and which then delivers them, one by one and oriented lengthwise, to the elevator or other receiving device.

This apparatus comprises essentially a skip open at one of its ends and which can be disposed obliquely, the open end being located at the top. The bottom of the skip includes a conveyor which carries the bales tipped into the skip along towards the said open end and this open end is equipped with a deflecting arrangement providing an exit opening through which the bales can only pass directed lengthwise and one by one, those bales which are situated on top of other bales being sent back within the skip by the action of this deflecting arrangement.

So as to avoid blocking which could occur in particular when there are a large number of bales, the deflecting arrangement, according to a modified construction, may comprise rollers mounted obliquely and for free rotation at the exit of the skip so as to direct the bales towards the exit opening or lift them to cause them to fall back to the rear, according to the position in which they present themselves against the said rollers.

These rollers are advantageously frustoconical and mounted, with the small base directed downwardly, on oblique spindles disposed between the bottom of the skip and the upper ends of the side walls of the latter.

Still so as to combat blocking and prevent the simultaneous exit of a plurality of bales, a bale receiving device arranged so as to arrest the conveyor as long as the bale it has received has not left it, may be provided at the exit of the apparatus so as to slow down the flow of the bales towards the deflecting arrangement, whether this is fixed or equipped with rotary rollers.

So as to improve the operation of the apparatus further, there may be added to the skip a movable barrier disposed transversely of the direction of movement of the upper strand of the conveyor and the lower edge of which is normally located at a distance from the bottom of the skip ranging between the height and twice the height of a bale when it is disposed horizontally. This barrier is mounted resiliently in lateral guides inclined upwardly and forwardly with respect to the aforesaid direction so as to be able to rise under the thrust of bales stacked on top of the bales sliding along the bottom of the passageway. Generally, it arrests the said bales, which drop back on to the bottom of the passageway when the subjacent layer has passed below the barrier, but, in the event of packing, if the thrust becomes too great, it can allow some of the bales on top to pass, thereby avoiding obstruction.

Still according to the invention, the receiving capacity of the apparatus may be increased by arranging an auxiliary conveyor in advance of the skip conveyor, the auxiliary conveyor being preferably substantially horizontal and moving more slowly than the skip conveyor.

Due to this improvement, an entire load of bales can be discharged on to the auxiliary conveyor, which transfers them little by little to the skip conveyor, further reducing the risks of obstruction. The apparatus improved in this way can easily be arranged in the body of a vehicle such as a trailer and operate in the said body.

Finally, again according to the present invention, the spacing of the defectors may be adjustable in particular as a function of the dimensions or the nature of the bales to be unloaded.

The description which follows with reference to the accompanying drawings given by way of non-limitative example will make it clearly understood how the invention can be carried into effect, the details appearing both from the drawings and from the text forming, of course, part of the said invention.

FIG. 1 is a diagrammatic perspective view of an apparatus according to the invention;

FIG. 2 is a view in longitudinal section illustrating the working of the apparatus;

FIG. 3 is a diagrammatic perspective view of an apparatus comprising rotary deflecting elements;

FIG. 5 is a detail view on a larger scale of the strut of the bale receiving device;

FIG. 6 is a perspective view of the rear of an improved apparatus according to a modified constructional form;

FIGS. 7 and 8 show a part of the barrier device in longitudinal and cross-section;

FIG. 9 is a front view of an apparatus similar to that of FIG. 6, but from which the barrier has been removed for greater clarity;

FIG. 10 is a diagrammatic side view of a modified form of apparatus equipped with an auxiliary conveyor.

In the embodiment shown in the drawing, the apparatus comprises a skip 1 of trapezoidal cross-section and the width of which is large enough for it to be possible to tip the contents of a trailer (2.50 meters, for example) conveniently into it. The skip is open at its end 2.

It is advantageously mounted on a set of wheels 3 and provided with a shaft or pole 4 a turned upwardly in such manner that, when the skip is rested on the shaft, which serves as a kind of supporting stand, its bottom is inclined by 40°, for example, with respect to the horizontal (FIG. 2).

The bottom 4 of the skip may be plain and covered over almost the whole of its width by the upper strand of a slat-type conveyor 5, the slats being spaced apart by a little more than the length of a bale and being carried by endless lateral chains 6 which pass over sprocket wheels 7 and 8 mounted below the skip 1 (FIG. 2). The upper sprocket wheels are driven by a motor and reduction-gear unit 9, which is electric, for example. The plain bottom could be eliminated, the conveyor then comprising slats which are sufficiently close for the bales to be unable to drop through.

In the vicinity of the end 2 of the skip, deflecting elements 10 are provided between which is provided a passage 11 through which the bales can leave only lengthwise and one by one.

It is known that balers generally make bales about 0.35 × 0.35 × 0.70 meter. A passage of about 40 centimeters is very suitable. At their base, the deflectors 10 form a rather small angle, of the order of 20° to 30°, for example, with the direction of movement of the conveyor 5, so as to direct the bales suitably towards the passage 11.

At their top, they prohibit passage of the bales and are contoured in such manner that when the apparatus occupies the loading position they offer to any bales which would possibly be riding on top of others and incurved or concave surface 12 which lifts them and then causes them to topple over towards the rear, as shown in FIG. 2. A bale which topples over in this way returns to the mass of bales located at the foot of the skip and takes its turn again to leave.

In order to use the apparatus, it is sufficient to discharge the contents of the bale trailer into it and the bales issue one by one oriented lengthwise to drop, for example, on to the elevator, which will take them away towards the barn or other store.

In FIG. 3 there can be recognised the skip 1, on the bottom 4 of which the conveyor 5 moves, being driven by the motor 9.

The deflecting elements, instead of being fixed, are constituted by frustoconical rollers 13 which turn freely on oblique spindles 14 disposed between the bottom 4 of the skip and the upper ends of the side walls 15 of the latter. The small bases of the rollers 13 are located in the vicinity of the bottom of the skip and the passage 11 which the rollers form is rather narrow in order to compel the bales to issue oriented lengthwise.

The mass of bales, which is urged forward by the conveyor 5, comes into contact with the rollers 13 which then enter into rotation and direct the bales towards the passage 11 or lift them and cause them to topple over towards the rear, depending on the place where the said bales come into contact with these rollers.

The rollers 13 may be produced by means of bars directed along generatrices and fixed to two base circles, or again they may have a continuous lateral surface, of sheet metal for example. Their angle at the vertex may be of the order of 60° to 80°, the inclination of their spindles being 30° to 45°, for example.

So as to prevent the exit of a plurality of bales at a time or, in the case of deflectors according to FIGS. 1 and 2, so as to avoid obstruction, a bale receiving device is provided in order to ensure intermittent operation of the conveyor 5.

Figure 4:
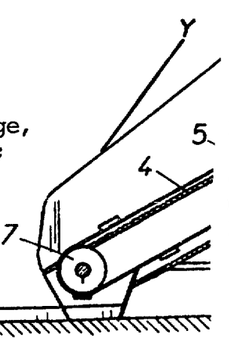
FIG. 4 is a view in longitudinal section showing a bale receiving device ensuring intermittent operation of the conveyor.

On leaving the skip, the bale which has passed through the passage 11 drops on to an inclined tray 16 articulated about a transverse spindle 17 in the vicinity of the upper edge of the bottom of the skip and at 18 to a strut 19 which is moreover articulated to the axle of the apparatus (FIG. 4).

The strut 19 is telescopic. It comprises a lower rod 21 urged downwardly by a spring 22. The rod 21 bears a cut-off device 20a and a contactor 20 which can be actuated by a lug 23 provided on the body of the strut, as shown in FIG. 5. As soon as this actuation occurs, the contactor 20 actuates the cut-off device 20a which cuts off the power supply 20f of the motor 9 of the conveyor.

The bale leaving the skip weighs on the tray 16 and this causes the shortening of the strut 19 and therefore the actuation of the contactor 20 and the arrest of the conveyor. The bale slides out of the tray, which the spring 22 brings back to its initial position, at the same time releasing the contactor 20, which restores the power supply of the motor 9 until the dropping of a fresh bale again causes the cutting-off of the power supply and so on.

In this way, a rush of bales to the exit of the skip is avoided.

If the conveyor is driven by an electric motor, the cut-off device 20a is an electric switch adapted to open the power supply circuit when the contactor 20 is actuated by lug 23 and to close the circuit when the contactor 20 is not actuated. However, if the conveyor is being driven by a non-electric motor, for example, a hydraulic motor, the cut-off device 20a may be simply by a valve adapted to interrupt the flow of the power supply to the motor when the contactor 20 is actuated by the lug 23, and vice versa.

Advantageously, a timer adjustable, for example, for up to 30 seconds, is associated with the contactor 20 in the motor circuit so as to permit regulation of the rate of exit of the bales.

In the embodiment shown in FIGS. 6 to 9, the skip 1, the bottom 4 of which forms a kind of flat passageway in which the conveyor 5 moves between two slightly raised lateral edges 30 (FIG. 6) which have a tendency to lead the bales back towards the conveyor, has on each side vertical rail structures 31 formed, for example, by metal tubes.

Articulated at two points at the front edge of the rail structures are supports 32 in which are mounted with play the upper ends of the spindles 14 of deflecting rollers 13a of substantially frustoconical form of the kind of those which have been described hereinbefore. These rollers are produced by means of suitably bent meridian wires 33 (FIGS. 6 and 9) welded at their ends to an axial tube 34. The lower ends of the spindles 14 are shaped after the fashion of cranks and are each seated in one of the sockets of a series of parallel sockets 35 provided on the exit crosspiece of the skip on the corresponding side of the receiving tray 16 (FIG. 9). In this way, the width of the vertical space provided between the two rollers 13a can be varied so as to adapt it to the width of the bales being unloaded.

U-shaped slides 36 parallel to, and facing, one another are attached to each of the rail structures 31 (FIGS. 6 to 8). These slides are inclined upwardly and towards the exit by about twelve degrees with respect to the direction of the bottom of the skip (FIG. 8).

The slides serve to guide the ends of a movable barrier 37 formed, for example, by a sheet metal box having a rounded lower edge 38. The said ends are drawn back downwardly by means of draw springs 39 against stops 40 (FIGS. 7 and 8) disposed in the slides at a location such that the edge 38 is drawn back to a distance from the bottom 4 of the skip equal to about one and a half times the height of a bale.

Due to this arrangement, those bales which slide flat along the bottom 4 pass through without touching the barrier. Those bales which are upright are knocked over and laid horizontally on the bottom. Those which are located on top of other bales are arrested and the others slide below them until all of them have passed through. If a bale happens to become jammed, the barrier rises in opposition to the springs 39 and allows it to pass through, thereby avoiding any obstruction. Sufficient clearance is provided at the ends of the barrier in the slides (FIG. 7) for the barrier to be able to rise only on one side if it is pushed back by only one bale moving along one edge of the conveyor.

In the modified arrangement of FIG. 10, an auxiliary conveyor 41 is mounted on a complementary 42 in advance of the main conveyor 5. The auxiliary conveyor is slightly inclined with respect to the horizontal so that its exit end is located a little above the entry end of the main conveyor.

The latter is driven by a motor 9 located close to its exit and its lower transmission shaft 43 is connected to the adjoining shaft 44 of the auxiliary conveyor by a chain transmission 45 calculated in such manner that the speed of the main conveyor is higher than that of the auxiliary conveyor, for example approximately twice the latter speed. On this account, the main conveyor discharges the bales faster than it receives them, which further reduces the risks of obstruction.

The apparatus may be placed in its order of operation in the body 46 of a vehicle and this enables an entire load of bales to be discharged on to the auxiliary conveyor and the bales to be collected one by one at the exit of the main conveyor.

It is obvious that the embodiments described are only examples and that could be modified, in particular by substituting technical equivalents, without thereby departing from the scope of the invention.

I claim:

1. Apparatus for unloading one by one bales of straw, hay or similar products stored in bulk, comprising:
   an inclined passageway open at its upper end;
   a longitudinal conveyor above the bottom of said passageway;
   convergent deflectors at the upper end of the passageway forming an exit opening through which the bales can pass only one by one oriented lengthwise, the deflectors being arranged such that those bales which are located on top of other bales are sent back to the rear, a motor for said conveyor having a power supply circuit, cut-off means for cutting said power supply circuit in and for cutting it out, and a bale receiving device comprising a movable tray linked to said cut-off means so that the power supply circuit is cut out when a bale is on said movable tray and cut in when a bale is not on said movable tray.

2. Apparatus as claimed in claim 1, wherein the tray is articulated to the passageway and supported by a telescopic strut combined with said cut-off means and ensuring the return of the tray as soon as it has been freed.

3. Apparatus as claimed in claim 1, wherein the tray is inclined so as to enable the bale to slide so as to free the said tray.

* * * * *

UNITED STATES PATENT AND TRADEMARK OFFICE
CERTIFICATE OF CORRECTION

PATENT NO. : 4,098,390

DATED : July 4, 1978

INVENTOR(S) : Robert G. Sheridan

Page 1 of 3

It is certified that error appears in the above-identified patent and that said Letters Patent are hereby corrected as shown below:

Title Page, Figure 4;

Line Y should be deleted from the figure. Figures 4 and 5 are too close together and line Y was mistaken for part of Figure 4.

UNITED STATES PATENT AND TRADEMARK OFFICE
CERTIFICATE OF CORRECTION

PATENT NO. : 4,098,390
DATED : July 4, 1978
INVENTOR(S) : Calvet

Page 2 of 3

It is certified that error appears in the above-identified patent and that said Letters Patent are hereby corrected as shown below:

Drawings, Figure 4; "20b" should read --20--
Drawings, Figure 4, copy of drawings with corrections marked in red, sent with Response and Amendment, dated July 1, 1977.

UNITED STATES PATENT AND TRADEMARK OFFICE
CERTIFICATE OF CORRECTION

PATENT NO. : 4,098,390

DATED : July 4, 1978

INVENTOR(S) : Calvet

It is certified that error appears in the above-identified patent and that said Letters Patent are hereby corrected as shown below:

Col. 2, line 12; "defectors" should read —deflectors—
Col. 2, line 49; "4" should read —4a— Paper No. 12, CHANGES AND/OR ADDITIONS TO THE APPLICATION RECORD MADE BY THE EXAMINER UPON ALLOWANCE, bottom line.
Col. 3, line 63; "20f" should read —20b— Response and Amendment dated July 1, 1977, page 1.
Col. 4, line 48; "sildes" should read —slides—
Col. 5, line 2; "complementary 42" should read —complementary frame 42—
Col. 5, line 24; "that could" should read —that they could—
Col. 6, line 8; "one oriented" should read —one and oriented— Response and Amendment dated July 1, 1977, page 2.

Signed and Sealed this

Third Day of April 1979

[SEAL]

Attest:

RUTH C. MASON
Attesting Officer

DONALD W. BANNER
Commissioner of Patents and Trademarks